April 12, 1932.  G. C. SOULE ET AL  1,853,939

ADJUSTABLE HOIST WING PLOW

Filed Oct. 18, 1929

Inventors.
JOHN B. WOODBURY.
GEORGE C. SOULE.

By Ellis Spear
Attorney.

Patented Apr. 12, 1932

1,853,939

UNITED STATES PATENT OFFICE

GEORGE C. SOULE AND JOHN B. WOODBURY, OF SOUTH PORTLAND, MAINE, ASSIGNORS TO MAINE STEEL PRODUCTS COMPANY, OF PORTLAND, MAINE, A CORPORATION OF MAINE

ADJUSTABLE HOIST WING PLOW

Application filed October 18, 1929. Serial No. 400,546.

Our present invention deals with wing snow plows. In such plows it is desirable that the wing members be adjustable both laterally and vertically and the problem has been to provide for such adjustments with a maximum range of adjustability and with adequate strength at the different positions of adjustment.

As illustrative of our invention we have shown a form in which a plow of general characteristic type is provided with a wing member. In this in accordance with our invention there is provided a maximum of vertical adjustability with a corresponding range of lateral adjustability or width, and at the same time with a provision for support in any one of the infinite number of positions of adjustment in which the wing may be placed.

As illustrative of such a structure we have shown in the accompanying drawings a plow having pivoted wings provided with means for adjustment and also in accordance with our invention with means for effecting said adjustment in such a way that the front and rear end of such sections may be raised and lowered so that the rear end of the wing will be picked up or lowered more rapidly than the forward end of the wing so that in its disposition to the road such a wing may be maintained in a position of maximum efficiency. This, furthermore, is combined with the lateral means of maintenance which in the form shown is a lateral strut arm. Such a means while illustrated as a lateral strut arm may be otherwise constituted, but the form shown is simple and efficient and is herein included as a desirable structure and so claimed. In the drawings:

Figures 2, 3, 4:
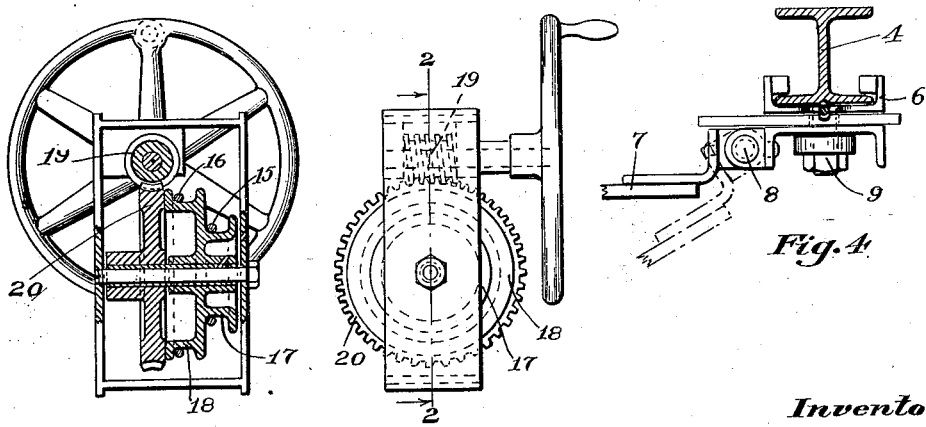
Fig. 2 is a section through the double drum hoist.
Fig. 3 is a side elevation of the same.
Figure 5:
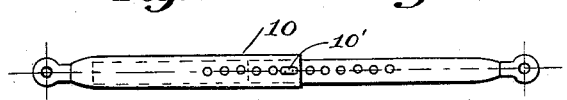

Fig. 4 a fragmentary view showing the wing slide and the universal wing blade connection therewith, and Fig. 5 a detail of the strut arm.

In the control of the side wings of these plows the important requirement has been to produce a maximum variation in the width of spread of the plow laterally while at the same time providing for a maximum vertical adjustment of the plow wing in order to take care of lateral shoulders or previous banks so that the snow picked up by the nose of the plow may be diverted at any desired level and delivered as far to the side of the plow as may be required.

In order to do this there is required a combined adjustability of the lateral wings. This necessitates a vertical adjustment of the front and the rear of the wings which under ordinary conditions is necessarily different in degree. At the same time the lateral adjustability has to be accommodated and this may or may not be simultaneous with the vertical adjustability. This involves four features of adjustment, one as to spread, one as to front end lift, one to rear end lift, and one to close or collapse the wing as in passing a vehicle or an obstruction.

To meet these separate requirements we have contemplated as two available factors, first a differential lift for simultaneously handling both the front and rear end of the wing, and secondly, a variantly adjustable support for the wing in its angle position so that in its different planes of vertical adjustment it may be given the proper lateral adjustment and support necessary to meet the lateral factors encountered by the plow in working in the wider ranges beyond the ordinary course of the tractor.

To this end we have provided a differential lift which will be hereinafter described by means of which we are able to raise the rear end of the plow wing more rapidly than the front and this differential being arranged in such proportion that the rear end will raise at a slightly increased rate which in ordinary practice is about 2 to 1.

At the same time we provide an adjustable and variable lateral control of the plow wings which while permitting this lift of the wing under the differential arrangement before described, is also adjustable to provide a simultaneous and accommodating reinforcement for the wing in any one of the various positions in which it may be adjusted by the vertical lift.

In the form shown this construction consists of a laterally adjustable and vertically movable strut which is pivotally attached to the wing at its outer end and at its rear end is carried by a vertically movable block adjusted in the slideway on the H beam which constitutes the rear frame of the nose portion of the plow. This provides for a vertically movable base support for the side strut in any position of the wing member so that wherever positioned this wing member may be backed up at any desired angle by the strut member which at the same time permits independently of its own vertical adjustment, the free movement of the wing member upwardly and inwardly of its arc of movement as provided by the differential adjustment before described. It will be noted that in this movement which is potentially in an arc of about 90° of angle, the adjustment is initially a vertical adjustment and in its secondary phase increasingly a lateral adjustment.

This combines with the adjustability of the strut by reason of which the center of swing may be raised so that the degree of vertical or lateral adjustability as provided by the differential adjustment means may be changed or varied as desired so that the side arm may be positioned at any degree of angle and any degree of vertical adjustment to meet any plowing conditions that may be required.

In the drawings we have indicated a single wing of a plow which in the form shown is adapted to be used with a truck as distinguished from a tractor. It will be understood that our invention is applicable to any type of wing plow and the truck type is merely selected for the purposes of illustration as being rather more simple than those of tractor type. We have indicated at B in dotted lines the body of a truck T and across the body top are beams 1 and 2. At the end of the forward beam 2 is supported a column 3. There is also provided for such construction a forward column 4 located adjacent the nose 5. The wing member comprises a slide 6 vertically adjustable on the column 4 and to this slide is pivoted the wing proper or blade 7, the blade 7 being hinged to the slide 6 so as to swing for lateral adjustment as at 8 and also pivoted as at 9 so as to be capable of being tipped at any desired angle to the horizontal. The wing blade is backed up in any position of its adjustment by a strut 10 which is pivotally connected to the free end of the wing blade at one of its ends and pivotally connected to a slide 11 at its other end. The slide 11 may be conveniently mounted on the column 3 on which it is vertically adjustable by a screw 12 controlled by a crank or other suitable rotating means 13.

By rotating the screw 12 the slide 11 may be positioned at any elevation so that the rear end of the strut 10 can be set in such position as to afford a suitable bracing for the wing blade at whatever elevation, or at whatever lateral angle, or at whatever position of tip to the horizontal it may be set.

In order to provide for these various adjustments without necessity of stopping the plow and without interrupting the work and so that varying conditions along the road may be met as they occur, we provide for a take-up. As heretofore pointed out it is desirable that the wing blade be increasingly inclined to the road in its successive vertical adjustments. There are two principal phases of the work to be done. One of these is where the depth of the snow permits the truck or tractor to scrape a wide surface all the way to the tip of the wing. In this position the wing wedge is close to the road and horizontal. As the snow becomes heavy and propulsion insufficient to overcome such resistance, it is necessary to raise the wing and let the nose do the plowing. The wing then acts as a conveyor and carries to one side the snow plowed by the nose. The matter of angularity is of great importance in widening work as it is necessary to move laterally banks plowed up by an original cut. These become higher and higher as widening is repeated, or where drifts have to be cleared out. In this work wings sloped with the wing tip higher than the front end give less torsional strains on the truck or tractor, as by elevation these strains are applied less severely at the outer end and give less leverage. This also forms a sloped bank with less of a vertical shelf which does not hold the transversely drifting snow.

From the foregoing reasons it will be seen that there is a great advantage in having a wing adjustment which provides that the wing be parallel to the ground in its lowest position and increasingly pitched up as it is raised to higher levels. It is also important, as herein provided, that in meeting traffic or obstacles that it be possible to close in the wings entirely to a collapsed position. Due to the effect of wind and other disturbances different conditions are met with in rapid succession on almost any road plowing job. The adjustments must therefore be made quickly and easily in order to save time and expense. This we accomplish simply but effectively by our differential hoist and mounting and all effectively braced by the adjustment of the strut rods.

We accomplish this differential adjustment by plural drum hoists one for the forward or pivoted end of the wing as a whole, and the other for the free end of the wing blade. These hoists are in the form shown a pair of wire cables 15 and 16 suitably connected one to the wing slide 6 and the other to the blade 7. The cable 15 from the slide 6 is passed over a sheave 4¹ on the column 4 and led to a pulley 14 on the column 3. The cable 16 from the free end of the wing blade passes over a sheave 14¹ on the column 3.

To operate these cables simultaneously but to take up on them at different rates, we provide a differential take-up. In the form shown this consists of a pair of drums 17 and 18 connected or preferably integral. The drum 17 is of smaller diameter than 18 and to it is attached the front cable 15 for raising the wing member vertically on the column 4. The cable 16 attached to the larger drum 18 preferably is taken up at about twice the rate as is the front cable 15 so that as the wing member as a whole is elevated, the rear end of its blade is increasingly elevated so as to give the blade an increasing pitch. The drums are adjusted by a worm 19 engaging a worm gear 20 connected to the drums so that the wing may be raised and held as desired.

In these various positions of adjustment the strut 10 being pivoted to the blade 7 and the slide 11 is rocked to accommodate any such movement. In so doing it has a potential movement of about 90° arc. As before mentioned this arc considered from the horizontal first has a maximum component of vertical rise, and in its movement towards the vertical has a maximum movement horizontally towards the truck.

This therefore introduces two guiding factors in addition to the pull of the hoist particularly in the free end of the wing blade, the tendency of course being to narrow the spread of the wing as it rises. The strut 10, however, being vertically adjustable on the column 3 through its slide 11 may be given any vertical position at its rear end. This affords an additional factor of adjustment and very importantly provides for the positioning of the strut at a suitable bracing angle to the wing blade so as to provide the necessary support for the wing blade.

Figure 1:
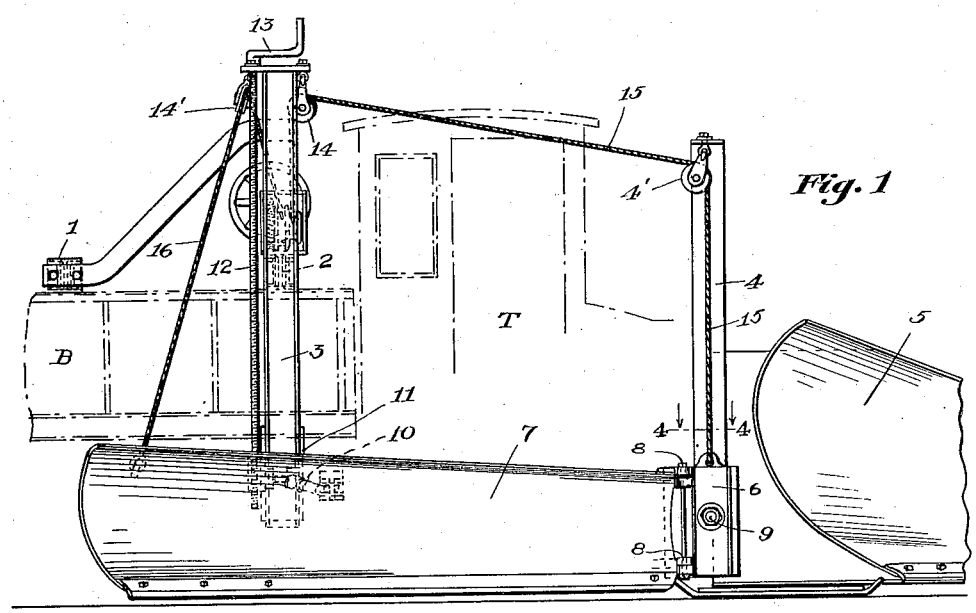
Fig. 1 is a side elevation of so much of a plow as is herein involved.
Figure 1A:
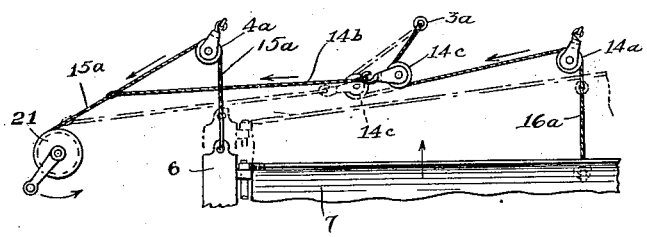
Fig. 1a is a modification of the differential hoist shown in Fig. 1.

The strut 10 furthermore is adjustable as at 10¹ so that its length can be varied and this provides for still further variations in the desired adjustment. It will therefore be seen that with such a rig the wing plow becomes so controllable that the operator can immediately meet any varying condition encountered along the road and can do so without stopping the plow or delaying the work. As before suggested, the construction shown is illustrative and the several parts or features while preferably combined to give the maximum range of adjustments heretofore described, may, of course, be used singly or in sub-combinations, although at a lessened efficiency to meet general conditions. The differential wing hoist before described may, of course, be effected in different ways, although that shown in Fig. 1 is preferred. We have indicated in Fig. 1a a differential hoist in which the forward hoist cable for raising the slide 6 is indicated at 15a passing over a sheave 4a and thence to the slide 6. The rear end hoist 16a passes about a sheave 14a being anchored at 3a. The sheave 14c is attached to a cable 14b which is spliced to the cable 15a which is passed to a single drum 21. When the drum 21 is turned the cable 16a will be taken in twice as fast as will 15a so that the free end of the wing blade 7 will be raised substantially twice as fast as will its forward end attached to the wing slide 6. Such a rigging may further be effected by the use of double and single pulleys. The two to one ratio is generally found to be satisfactory, but may be varied to meet conditions. To this end the drum structure is of advantage in that drums of different proportions may be substituted as desired.

All such modifications of hoist, as well as details of structure are to be understood as within our concept within the limits of the appended claims.

What we therefore claim and desire to secure by Letters Patent is:

1. In a snow plow, a wing member connected for vertical and lateral adjustment at one end to a support, and having a free end, a hoist for the connected end and a hoist for the free end of the wing member, and means common to both hoists for taking up on said hoists at different rates.

2. In a snow plow, a frame including a vertical slideway, a slide thereon, a wing member pivoted to said slide and having a free end, a hoist for the slide and a hoist for the free end of the wing member, and means common to both hoists for taking up on said hoists at different rates.

3. In a snow plow, a vertically adjustable pivoted blade having a free end, a hoist for raising the pivoted end of the blade vertically, a second hoist for raising the free end of the blade, and means common to both hoists for simultaneously taking up on said hoists at different rates whereby the free end is increasingly elevated above the pivoted end as the wing member is elevated.

4. In a snow plow, a vertically adjustable pivoted blade having a free end, a hoist for raising the pivoted end of the blade vertically, a second hoist for raising the free end of the blade, a pair of differential drums common to the two hoists and means for rotatably adjusting said drums.

5. In a snow plow, a vertically adjustable pivoted blade having a free end, a hoist for raising the pivoted end of the blade vertically, a second hoist for raising the free end of the blade, and means common to both hoists for simultaneously taking up on said hoists at different rates whereby the free end is increasingly elevated above the pivoted end as the blade is elevated comprising a pair of differential drums for the two hoisting cables, a gear on said drums and a worm drive for rotatably adjusting said drums.

6. In a snow plow, a front and a rear column, a slide on the front column, a wing blade pivoted at one end to said slide and having its other end free, a hoist for raising the wing slide vertically, a second hoist for raising the free end of the blade, and means common to both hoists for simultanenously taking up on said hoists at different rates whereby the free end is increasingly elevated above the pivoted end as the blade is elevated.

7. In a snow plow, a front and a rear column, a slide on the front column, a wing blade pivoted at one end to said slide and having its other end free, a hoist for raising the wing slide vertically, a second hoist for raising the free end of the blade, a pair of differential drums common to the two hoists, and means for rotatably adjusting said drums.

8. In a snow plow, a forward column and a rearward column, a slide adjustable vertically on said forward column, a wing having a pivotal and a hinged connection at its forward end to said slide and free at its rear end, a second slide adjustable vertically on said rearward column, a bracing strut interposed between said second slide and the rear end of said wing and pivotally connected at one end to said second slide and at its opposite end to said wing, means for adjusting said second slide vertically, a hoist connected to the forward end of said wing and a hoist connected to the rear end of said wing, and a common operating means for taking up on both of said hoists at different rates.

9. In a snow plow, a forward column and a rearward column, a slide adjustable vertically on said forward column, a wing having a pivotal and a hinged connection at its forward end to said slide and free at its rear end, a second slide adjustable vertically on said rearward column, a telescopic bracing strut interposed between said second slide and the rear end of said wing and pivotally connected at one end to said second slide and at its opposite end to said wing, a screw having a crank for adjusting said second slide vertically, a hoist connected to the forward end of said wing and a hoist connected to the rear end of said wing, and a common operating means for taking up on both of said hoists at different rates.

In testimony whereof we affix our signatures.

GEORGE C. SOULE.
JOHN B. WOODBURY.